United States Patent
Gorelick et al.

(10) Patent No.: US 12,455,901 B2
(45) Date of Patent: Oct. 28, 2025

(54) METHOD AND SYSTEM FOR ENTRY, TRANSFER, STORAGE, TRANSMISSION AND RETRIEVAL OF MEDICAL, HEALTH AND HEALTHCARE RELATED DATA

(71) Applicant: Galaxy Med LLC, Albertson, NY (US)

(72) Inventors: Joseph G. Gorelick, Holliswood, NY (US); Aaron Wachpress, Great Neck, NY (US); Bernard Juster, Netanya (IL)

(73) Assignee: Galaxy Med LLC, Albertson, NY (US)

( * ) Notice: Subject to any disclaimer, the term of this patent is extended or adjusted under 35 U.S.C. 154(b) by 1060 days.

(21) Appl. No.: 15/420,187

(22) Filed: Jan. 31, 2017

(65) Prior Publication Data
US 2018/0218124 A1 Aug. 2, 2018

(51) Int. Cl.
*G06F 16/28* (2019.01)
*G06F 21/62* (2013.01)
*G16H 10/60* (2018.01)
*G16H 10/65* (2018.01)
*G16H 80/00* (2018.01)
*H04L 67/02* (2022.01)

(52) U.S. Cl.
CPC ........ *G06F 16/285* (2019.01); *G06F 21/6245* (2013.01); *G16H 10/60* (2018.01); *G16H 10/65* (2018.01); *G16H 80/00* (2018.01); *H04L 67/02* (2013.01)

(58) Field of Classification Search
CPC ... G06F 16/285; G06F 21/6245; G16H 10/60; G16H 10/65; G16H 80/00; H04L 67/02
USPC .......................................................... 705/3
See application file for complete search history.

(56) References Cited

U.S. PATENT DOCUMENTS

| | | | |
|---|---|---|---|
| 2005/0108057 A1* | 5/2005 | Cohen | G16H 40/20 705/3 |
| 2014/0222684 A1* | 8/2014 | Felsher | G16H 10/60 705/50 |
| 2016/0051146 A1* | 2/2016 | Eaton | G16H 40/20 340/870.07 |

FOREIGN PATENT DOCUMENTS

| WO | WO-2013113756 A1 * | 8/2013 | G06F 19/00 |
|---|---|---|---|
| WO | WO-2019148130 A1 * | 8/2019 | G06F 16/27 |

OTHER PUBLICATIONS

Andrea Fox, Tapping into the trove of standardized EMS data, Healthcare IT News, Mar. 22, 2024, available at https://www.healthcareitnews.com/news/tapping-trove-standardized-ems-data.

(Continued)

*Primary Examiner* — Jason B Dunham
*Assistant Examiner* — Kimberly A. Sass
(74) *Attorney, Agent, or Firm* — Jacob Baldinger, P.L.L.C.

(57) ABSTRACT

A system and method for end-to-end entering, storing and maintaining a person's medical data that is critically needed to be known to among others, first responders and healthcare providers when they intervene, a device to be carried, worn by or implanted internally in the patient at all times, a device to be carried by first responders and other healthcare providers or fixed at healthcare facilities and offices that enables retrieving the emergency medical data, a server with a database for secure storage and retrieval of the medical data for all of the patients, and a communication system for relaying the medical data to the hospital before the patient arrives to the emergency/triage station and a wireless self-organizing network for assuring communications in case commercial wireless networks are unavailable or malfunctioning.

20 Claims, 5 Drawing Sheets

(56) References Cited

OTHER PUBLICATIONS

Andrea Fox, HIE pilot tackles emergency response data silos, Healthcare IT News, Aug. 8, 2024, available at https://www.healthcareitnews.com/news/hie-pilot-tackles-emergency-response-data-silos.

* cited by examiner

METHOD AND SYSTEM FOR ENTRY, TRANSFER, STORAGE, TRANSMISSION AND RETRIEVAL OF MEDICAL, HEALTH AND HEALTHCARE RELATED DATA

TECHNICAL FIELD

The present disclosure relates to a method and system for medical data entry, storage and retrieval by individuals and their healthcare providers, be they first responders and/or medical staff in both emergency and non-emergency situations.

BACKGROUND

The need for medical information in emergency situations and the portability for an individual of their data from one provider to another is not new, and presently in most cases people do not carry on them medical information that is essential in such situations. Individuals may become unconscious or simply unable to provide such information such as diseases, medical conditions, allergies, medications, etc. Others include patients with high risk conditions such as diabetes, some of which carry items such as bracelets that state "Diabetic" however without any important additional information such as which type of insulin and/or oral diabetes medications they take. Additionally, individuals who change doctors or have several doctors locally or in different geographies such as summer or winter homes or while on travel, face long intake times filling out forms that are at best recollections of their medical profiles and oft-times are required to have repeated medical testing as such information is not portable.

While the ability to manually enter data into a system is good and in some cases necessary, reality has shown that people are disinclined to manually enter their medical data, let alone maintain it and keep it up to date as changes occur. The present invention, while including manual entry as an alternative for entry, addresses this problem among others.

SUMMARY OF INVENTION

A system and method for end-to-end entering, storing and maintaining a person's medical data that is critically needed to be known to among others, first responders and healthcare providers when they intervene, a device to be carried, worn by or implanted internally in the patient at all times, a device to be carried by first responders and other healthcare providers or fixed at healthcare facilities and offices that enables retrieving the emergency medical data, a server with a database for secure storage and retrieval of the medical data for all of the patients, and a communication system for relaying the medical data to the hospital before the patient arrives to the emergency/triage station and a wireless self-organizing network for assuring communications in case commercial wireless networks are unavailable or malfunctioning.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION OF THE INVENTION AND EXAMPLE EMBODIMENTS

Figure 1:
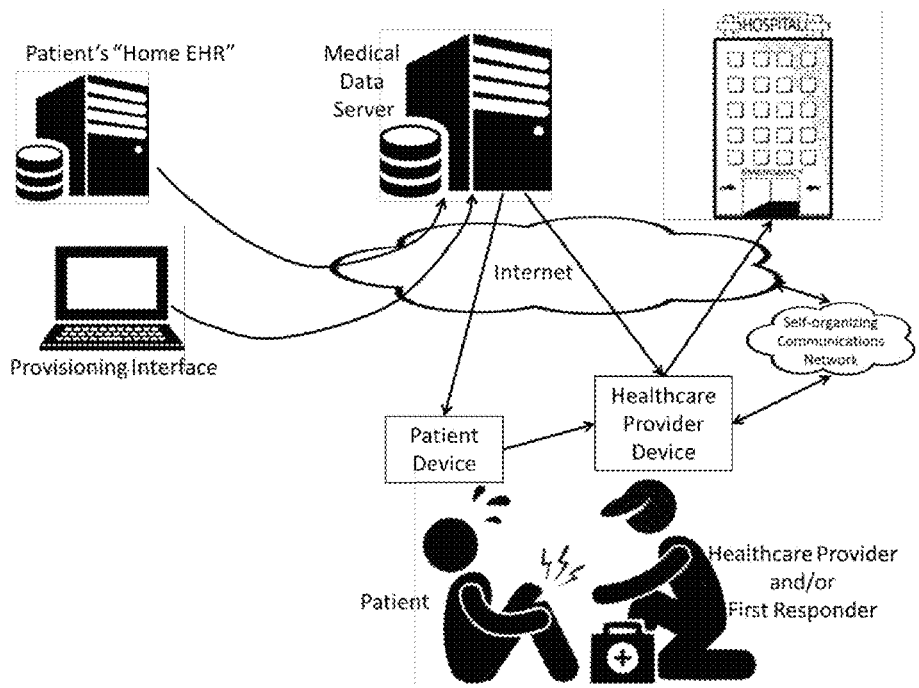
FIG. 1 depicts a graphical representation of the main entity types involved with the system, according to at least one example embodiment.

Some detailed example embodiments are disclosed herein. However, specific structural and functional details disclosed herein are merely representative for purposes of describing example embodiments. Example embodiments may, however, be embodied in many alternate forms and should not be construed as limited to only the example embodiments set forth herein.

Accordingly, while example embodiments are capable of various modifications and alternative forms, example embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

The terminology used herein is for the purpose of describing various example embodiments only and is not intended to be limiting of example embodiments. As used herein, the singular forms "a," "an," and "the" are intended to include the plural forms as well, unless the context clearly indicates otherwise. It will further be understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein, but are to include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

FIG. 1 depicts the main entity types involved with the system, according to at least one example embodiment.

The Patient Device is an object that the Patient must carry at all times in order for the disclosed invention to be effective. It can have many forms of embodiments, for example a card in the patient's wallet, a bracelet, amulet, wristwatch, implanted device, etc. A possible embodiment can even be as simple as a graphic tattooed on the Patient's body.

The Healthcare Provider and/or First Responder can be a professional healthcare provider such as a physician, nurse, emergency medical technician (EMT), etc., as well as non-professional person who finds himself/herself responding to a medical situation, such as a person who ran into an Alzheimer's patient wandering or a person who collapsed, a person involved in a car accident or who witnessed an accident, etc.

The Healthcare Provider Device is an electronic device that the Healthcare Provider uses for retrieving the data via the Patient Device. It can have many forms of embodiments, for example a smartphone, tablet, laptop, desktop or other handheld or fixed data terminal. Its embodiment depends on the application, which input/output it must carry such as screen or printer, which type of connectivity such as cellular data, Wi-Fi, memory card slot etc.

The Personal Medical Data Server is a computer server with a database, typically hosted in a secure data center. The Personal Medical Data for all of the patients who are registered to the service are securely stored in the secure database. The server hosts applications for data creation, storage, modification and retrieval of medical data. Other back-office applications like administration and billing are also hosted in the server. Server operations are operated by authorized Client entities.

The Provisioning Client enables the creation of a Patient record in the database as well as entering and editing its data. Provisioning can be performed by an individual who manually creates a new Patient record and enters the requested data. The human interface can be over a web browser that communicates with an HTTP server and/or via a dedicated client-server interface over the Personal Medical Data Server API. The API can be used for machine-to-machine provisioning, such as importing patient data from the patient external Electronic Health Record/Electronic Medical Record (EHR/EMR) systems.

The Self-organizing Communications Network enables the transmission of the Patient's emergency medical data as well as additional data generated by the Healthcare Provider, towards the hospital or other medical facility where the Patient is taken following the medical emergency event. It can be used for bi-directional communication of additional information such as messages between the first-responder healthcare providers and/or other healthcare providers or other entities. The data transmitted over the Self-organizing Communications Network is properly secured using encryption and any other required mechanism(s) so as to comply with regulatory requirements such as HIPAA.

Figure 2:
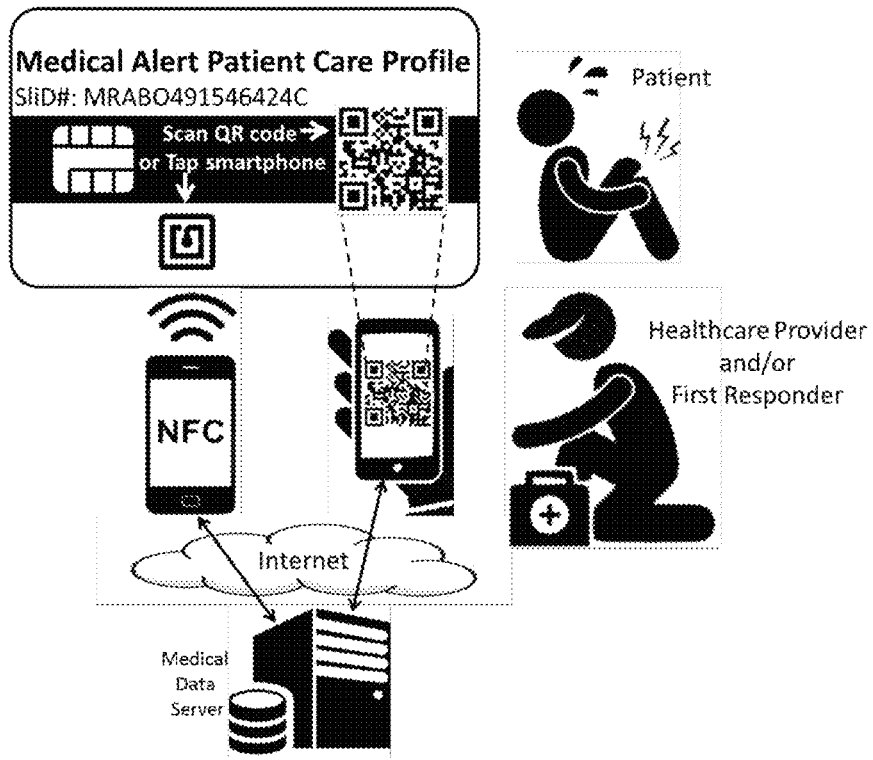
FIG. 2 depicts a graphical representation of a patient Medical Emergency Card with an integrated circuit ("chip"), a 2-dimensional barcode (e.g., QR code) and an NFC tag acting as embodiment of a Patient Device, a smartphone acting as an embodiment of a Healthcare Provider Device, and other system entities according to at least one example embodiment.

FIG. 2 shows a patient Medical Emergency Card with a chip, a 2-dimensional barcode, an NFC tag and a credit card-like chip acting as an embodiment of a Patient Device, a smartphone acting as an embodiment of a Healthcare Provider Device, and other system entities according to at least one example embodiment. In this embodiment, all the first responder and/or healthcare provider needs to carry is a smartphone or other terminal device with near-field communications (NFC) and/or one of the many available 2D barcode reading applications installed. If the smartphone is NFC-capable, all the Healthcare Provider needs to do is "tap" the smartphone on the card, tap the appropriate button and the Patient's emergency medical data will appear on the screen. Alternatively, the Healthcare provider may scan the 2D barcode with the smartphone to achieve the same result. In at least one possible embodiment, both the NFC tag and the 2D barcode include a URL address that points to the proper Patient record in the Medical Data Server database.

The Patient Medical Emergency Card may also be equipped with a magnetic strip containing a unique patient identifier. A matching Healthcare Provider device may be accordingly equipped with a magnetic card reader to retrieve information. The magnetic card may be activated by writing into the magnetic strip for example at the physician's clinic.

In another possible embodiment, the smartphone may be equipped with a dedicated pre-installed mobile application that performs additional functions such as prompting a first responder/health care provider with a list of the closest hospitals in the area, possibly using geolocation, and enabling the Patient medical data to be immediately transmitted to the selected hospital, together with information optionally enter by the first responder/health care provider such as the situation circumstances, type of injury, the patient's state of consciousness, initial treatments and interventions administered, etc.

Figure 3:
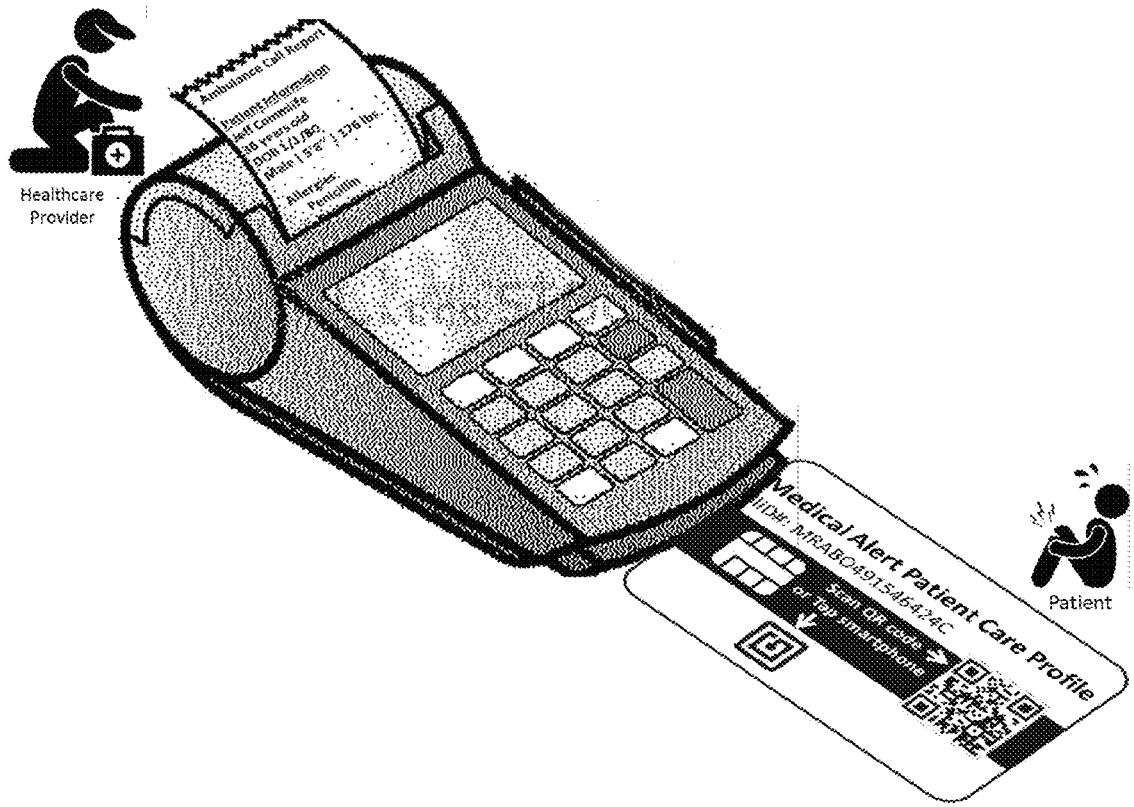
FIG. 3 depicts a graphical representation of a Medical Emergency Card with a 2-dimensional barcode, an NFC tag and a credit card-like chip acting as embodiment of a Patient Device, a smart terminal with a built-in printer and NFC reader acting as embodiment of a Healthcare Provider Device, and other system entities according to at least one example embodiment.

FIG. 3 shows a patient Medical Emergency Card with a 2-dimensional barcode and an NFC tag acting as embodiment of a Patient Device, a smart terminal with a built-in printer and NFC reader acting as an embodiment of a Healthcare Provider Device, and other system entities according to at least one example embodiment. The hardcopy printout produced by the built-in printer can be attached to the Patient or others so that medical and/or hospital staff has immediate access to it without the need for activating any equipment once the Patient arrives to the emergency room.

Regardless of whether or not the Healthcare Provider Device embodiment has a built-in printer, as long has it has a network connection, the Healthcare Provider can send the information to remote printers (for example at the emergency room).

Figure 4:
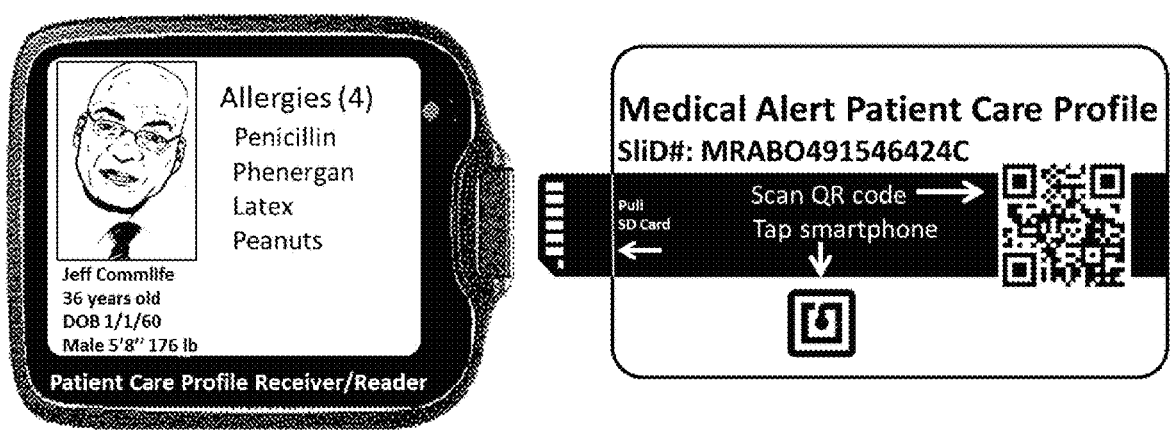
FIG. 4 depicts a graphical representation of a patient Medical Emergency Card with an internal Secure Digital memory card, 2-dimensional barcode and an NFC tag acting as embodiment of a Patient Device, a smart terminal with a built-in Secure Digital memory card reader acting as an embodiment of a Healthcare Provider Device, and other system entities according to at least one example embodiment.

FIG. 4 shows a patient Medical Emergency Card with an internal Secure Digital memory card, 2-dimensional barcode and an NFC tag acting as embodiment of a Patient Device, a smart terminal with a built-in Secure Digital memory card reader acting as an embodiment of a Healthcare Provider Device, and other system entities according to at least one example embodiment.

The 2-dimensional barcode and the NFC tag are identical to those depicted in the embodiment of FIG. 2, and can be read by a smartphone or other compatible device. In this embodiment however, a smart terminal is used instead of a smartphone and the Patient Device includes an additional component in the form of a built-in Secure Digital memory card which contains a copy of the patient's Emergency Medical Data. The advantage of this embodiment is that it will work also in the case where the connection between the Healthcare Provider Device and the Medical Data Server is not available.

The Smart Terminal includes a memory card reader. The First Responder/Healthcare Provider inserts the Patient's Medical Emergency Card to the memory card reader slot in the Smart Terminal and the Emergency Medical Data is transferred to the Smart Terminal for display and potential transmission to the hospital.

The Emergency Medical Data in the on-board memory card can be synchronized and updated with the Medical Data Server by means of a docking station in the Patient's home, office, etc.

The Smart Terminal can also be equipped with a camera and 2-dimensional barcode reader software and/or Near Field Communications electronics as alternative means to obtaining the emergency medical data from the Medical Data Server. Additional functionality can be added such as the ability to take pictures of specific wounds or other important visual information, scanning a handwritten Ambulance Call Report, and more.

The Smart Terminal can be equipped with additional functionality that enables the Healthcare Provider to enter information such as Ambulance Call Record information and/or additional relevant information which is then written into the memory card and remains stored. Later on, when the card resynchronizes to the Medical Data Server, this information stored in the memory card gets uploaded to the server. This information can remain stored in the Medical data Server in its original format and/or converted to the relevant Electronic Health Record (EHR) format (for example HL7) and the Patient's "Home EHR" (as illustrated in FIG. 1) can be updated and resynchronized with the Medical Data Server.

The Smart Terminal may be either a standard palm-sized terminal with a memory card slot such as those used in GPS navigation systems, or a device specifically designed and built for the purpose of implementing the present invention.

Figure 5:
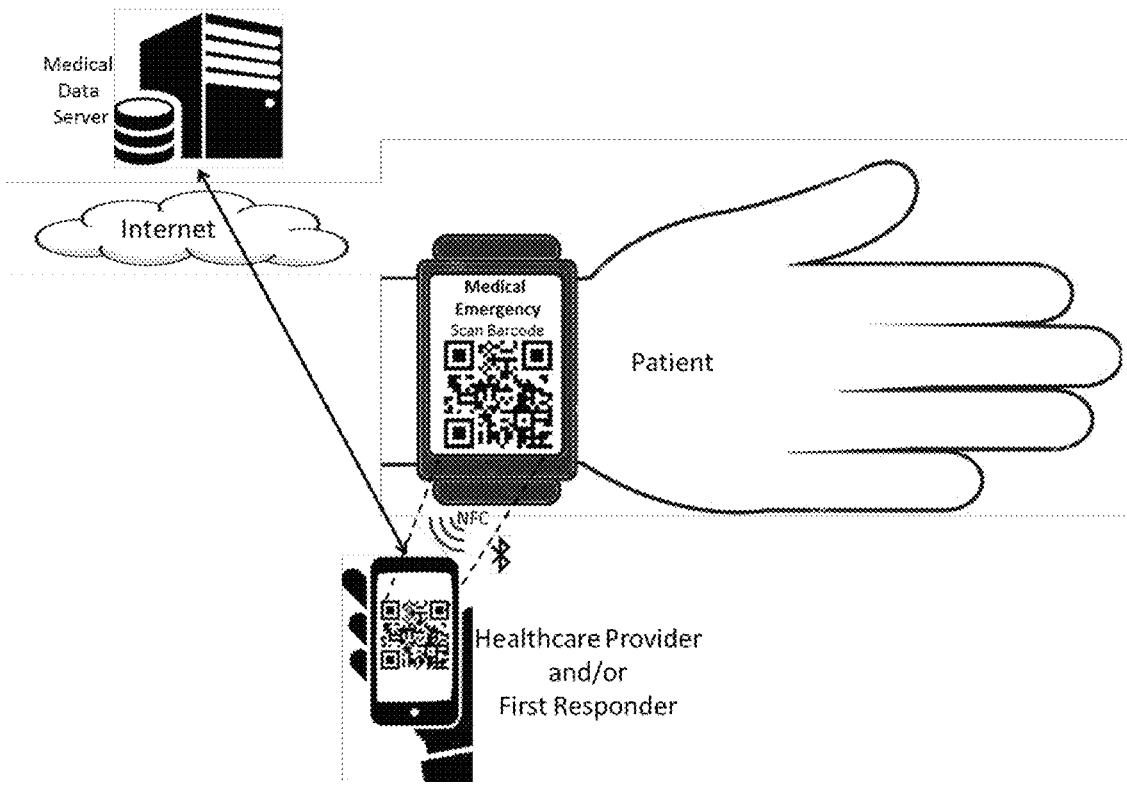
FIG. 5 depicts a graphical representation of a Smart Watch acting as embodiment of a Patient Device, a smartphone acting as an embodiment of a Healthcare Provider Device, and other system entities according to at least one example embodiment.

FIG. 5 depicts a Smart Watch acting as embodiment of a Patient Device, a smartphone acting as an embodiment of a Healthcare Provider Device, and other system entities according to at least one example embodiment. The Smart Watch could be a standard device available in the market or device specifically designed and built for the purpose of implementing the present invention.

The Smart Watch displays a 2-dimensional code similar to that described in previous embodiments. Displaying the 2-dimensional barcode can be initiated by pressing a button and/or by other mechanisms.

The Smart Watch may be equipped with an NFC tag, in which case the retrieval of Personal Medical Data can be initiated by tapping the Smart Watch with a smartphone or other NFC-enabled Healthcare Provider device.

The Smart Watch may be equipped with an accelerometer or other sensor so that displaying the 2-dimensional barcode can be triggered by a shock of configurable intensity (1G, 2G, etc.) or by immobility of configurable duration. Such an automatic display is extremely useful in case of accident or other medical emergency where the First Responder/Healthcare Provider easily notices that a 2-dimensional barcode is displayed on the Patient's wrist, and even if s/he does know about the service, s/he can scan the 2-dimensional barcode with a smartphone and access the Emergency Medical Data.

The Smart Watch may have built-in memory for on-board storage of Emergency Medical Data as described in the embodiment of FIG. 4. The SmartWatch internal memory can be updated and synchronized with the Medical Emergency Data Server wirelessly (Bluetooth, 3G, 4G, . . . ) and/or via a physical connection to a docking station. The built-in memory may be permanent and/or removable, for example a micro-SD card.

Figure 6:
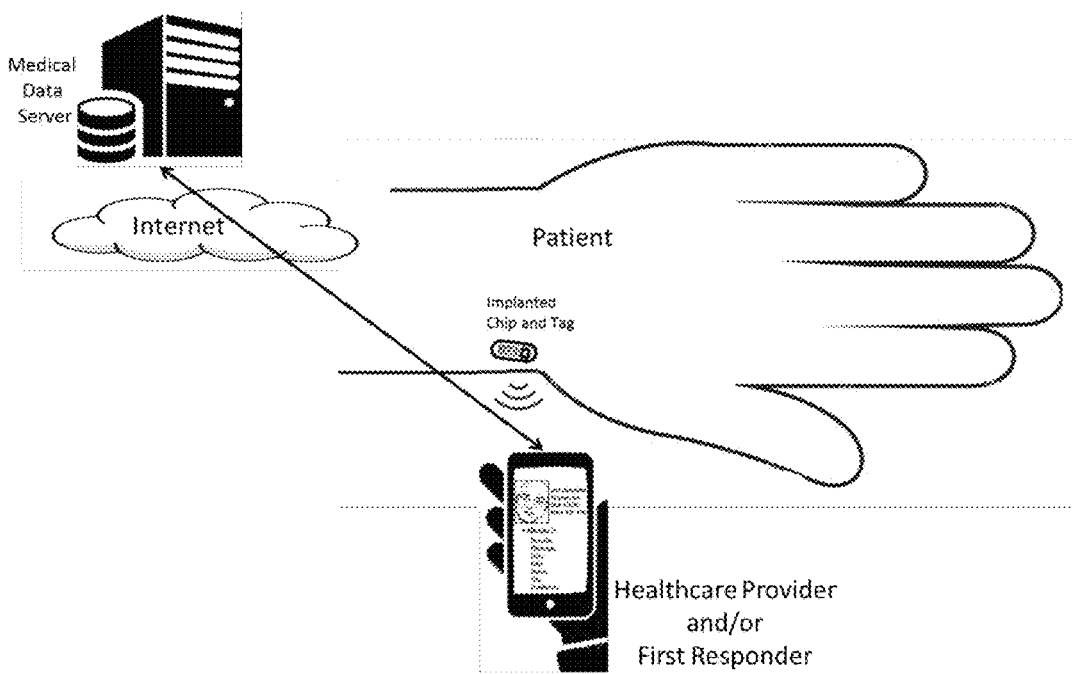
FIG. 6 depicts a graphical representation of an Implanted Chip acting as embodiment of a Patient Device, a smartphone acting as an embodiment of a Healthcare Provider Device, and other system entities according to at least one example embodiment.

FIG. 6 depicts an Implanted Chip acting as embodiment of a Patient Device, a smartphone acting as an embodiment of a Healthcare Provider Device, and other system entities according to at least one example embodiment.

Figure 7:
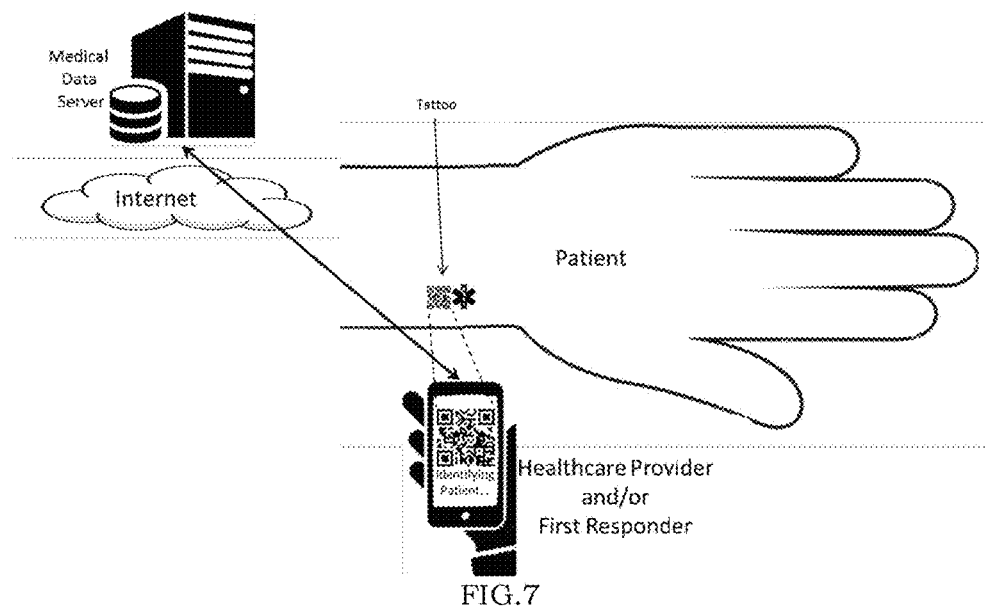
FIG. 7 depicts a graphical representation of a tattooed digital code acting as a replacement for the Patient Device, a smartphone acting as an embodiment of a Healthcare Provider Device, and other system entities according to at least one example embodiment.

FIG. 7 depicts tattooed digital code acting as a replacement for the Patient Device, a smartphone acting as an embodiment of a Healthcare Provider Device, and other system entities according to at least one example embodiment. The tattoo may be permanent or temporary.

Figure 8:
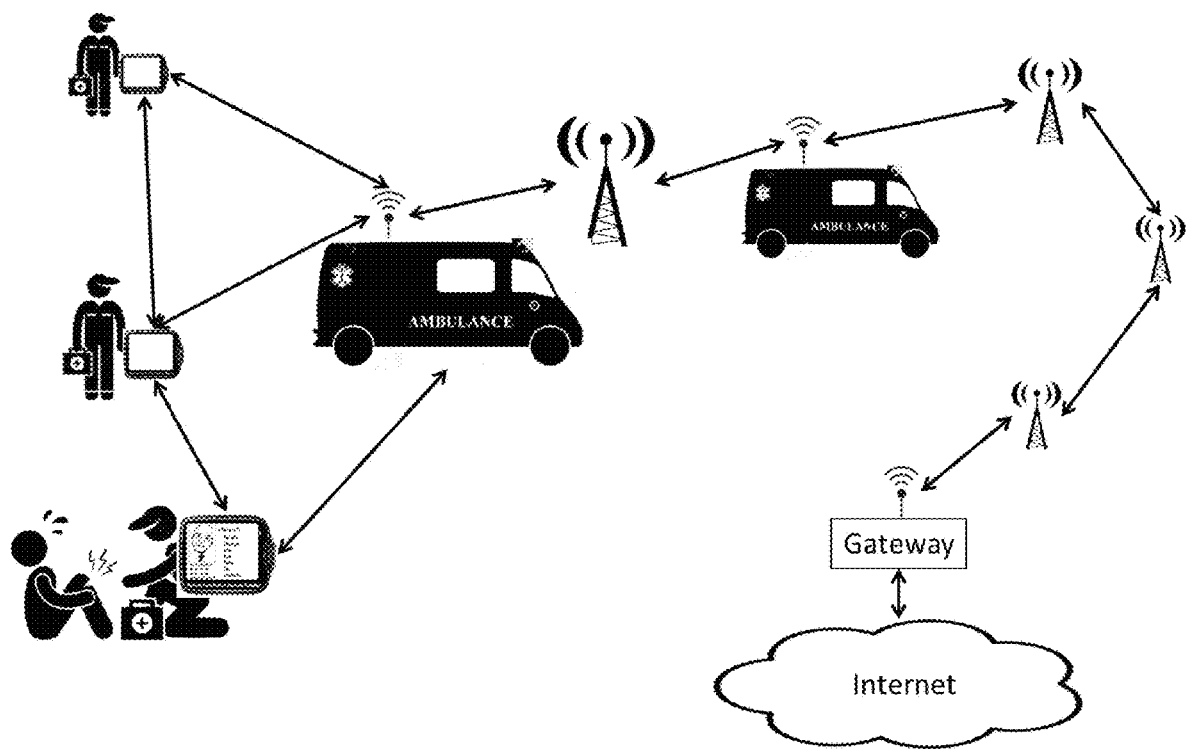
FIG. 8 depicts a graphical representation of a wireless self-organizing network for assuring communications in case commercial wireless networks are unavailable or malfunctioning, according to at least one example embodiment.

FIG. 8 depicts a wireless self-organizing network for assuring communications in case commercial wireless networks are unavailable or malfunctioning according to at least one example embodiment. The conditions for losing signal can be ordinary such as being in a tunnel or extreme such as an earthquake or terrorist attack. When such major disasters occur, commercial wireless networks often become disrupted or altogether unavailable. The present invention relies at least partially on wireless communications for accessing Emergency Medical Data (except for the case of a Patient Device with on-board Emergency Medical Data storage) and/or relaying medical data such as Ambulance Call Reports to hospitals. By taking advantage of the fact that first responders carry a Healthcare Provider Device and equipping these devices with wireless communications capabilities, each first responder can become a node in a wireless network that organizes itself on the fly as the event occurs, a link is spontaneously established between every two first responders in wireless communication range from each other, and other nodes can be added to the network such as ambulances and/or other emergency vehicles, fixed or ad-hoc relay stations, etc. As soon as at least one path between a first responder through various wireless nodes reaches a Wireless Gateway that is connected to the appropriate wireline infrastructure(s) such as the Internet and/or private lines, the first responder becomes capable of accessing the Medical Data Server and/or the hospital.

The wireless communication can be implemented by means of one or more standard radio interfaces such as available wireless telecom technologies including but not limited to GSM, EDGE, HSPDA, WiMAX, LTE, etc., Wi-Fi 802.11.x, 802.15.4, Bluetooth, as well as proprietary radio interfaces.

Certain nodes such as vehicles may be equipped with reliable wireless communications such as satellite-based communications.

The Self-organizing network may be used for additional functionality such as messaging between first responders and other relevant entities, voice communications, etc.

Figure 9:
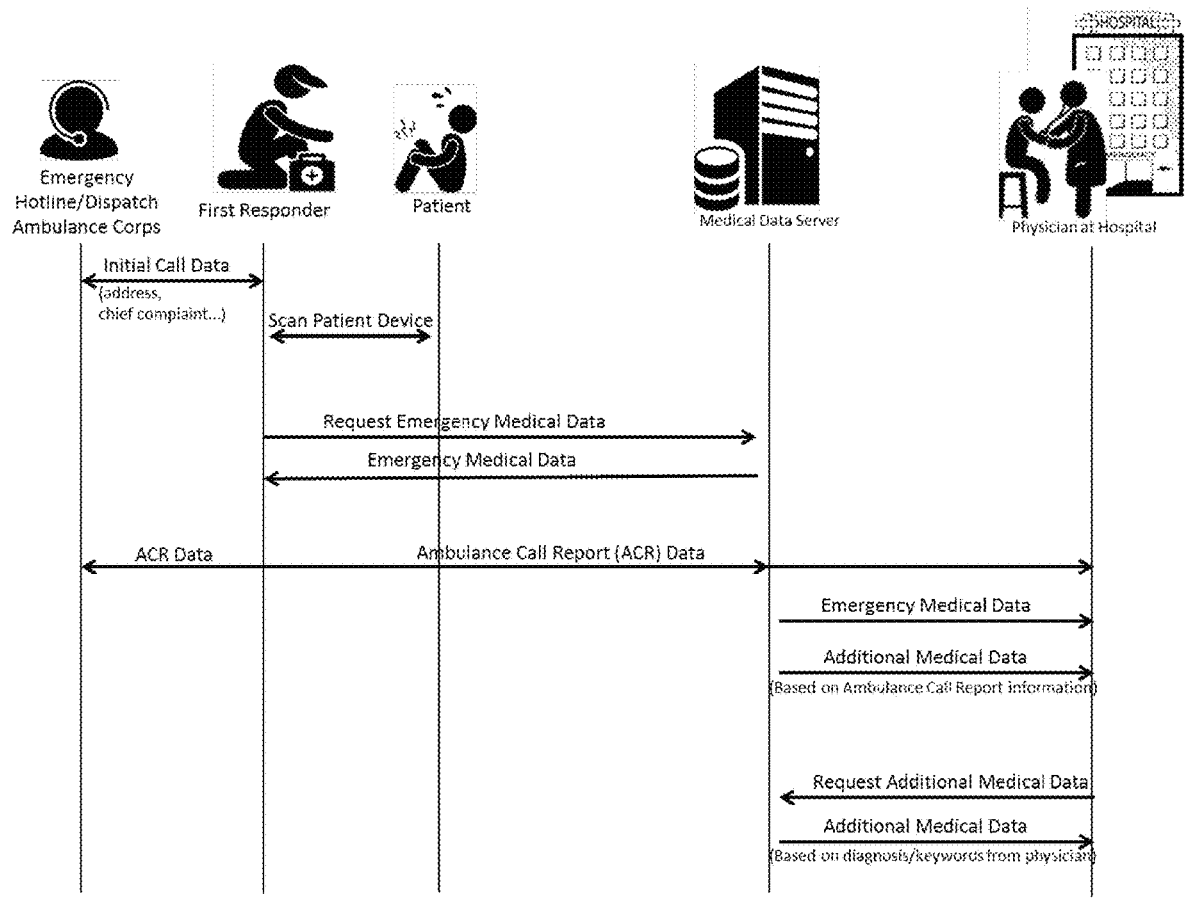
FIG. 9 depicts a graphical schema of a flow of data requests and data transfer between the various entities over the course of the medical event, according to at least one example embodiment.

FIG. 9 shows the flow of data requests and data transfers between the various entities over the course of the medical event, according to at least one example embodiment. If the medical event was triggered by a call to a hotline such as 911, the call data such as the address, chief complaint and other information regarding the situation is sent to the Healthcare Provider/First Responder. The Healthcare Device embodiment capabilities may include receiving the data over an electronic communications medium such as the Self-Organizing Network shown in FIG. 8, cellular network, etc. Moreover, given the emergency medical profile, a trained dispatcher can send appropriate personnel such as deciding between sending Basic Life Support units and/or Advanced Life Support units by having this additional data in addition to the caller's information about chief complaint. The First Responder uses the Healthcare Provider Device to connect to the Patient Device as described in previous figures and retrieve the Emergency Medical Data from the Medical Data Server so s/he can know all the pertinent emergency medical data such as allergies and chronic diseases. Following the initial care, the First Responder creates an Ambulance Call Report (ACR). The information of this ACR (such as details of the occurrence, complaints, visible wounds . . . ) can be entered via the Healthcare Provider Device by typing, scanning the handwritten ACR and performing OCR and/or other data entry methods. This information is then uploaded to the Medical Data Server which uses the information in order to retrieve all the data in the EHR that is relevant to the ACR content. The ACR may be also transmitted back to the Ambulance Corps. For example, if according to the ACR there is a Cardiac complaint and a recent EKG and/or stress test results are present in the EHR, those will be marked as relevant data. If the ACR suggests symptoms of an infectious disease, the Patient's immunizations in the EHR will be marked as relevant data, etc. If kidney failure is suspected, the creatinine results from all the blood tests over the past year may be marked as relevant, so that the results also can be trended. The Medical Data Server can then forward to the medical staff at the hospital all the Emergency Medical Data plus the additional data that was marked as relevant to the incident. The medical staff at the hospital may in a similar way also send information such as diagnosis and keywords that will trigger the same retrieval of all data that is relevant to these newly provided keywords and information. Among other benefits, this functionality can save time and duplication for example if the hospital physician requests a certain blood test (for example PSA) and the same test has been recently performed, the new test will be deemed redundant and will not be performed.

Communications between the different human entities in FIG. 9 is not necessarily limited to data, it can also include voice, video or any other media supported by the technology.

Collaboration entities and functionalities may be in any embodiment of the present invention, for example integration with outpatient clinics, automated scheduling of appointments, retrieval of results, medical imaging etc.

The present invention also includes support for an additional human entity type called "Emergency Contact". This person may be a family member, a nurse or other. The invention provides functionality to alert the Emergency Contact as soon as the Patient Device is used to access the Patients' Medical Data. The Emergency Contact also carries a device which can be his/her own smartphone or a dedicated custom-designed device. The Emergency Contact may use his/her device to perform various functions, for example, accessing the emergency medical data, ACR, additional data, make voice calls and/or send/receive text messages to/from Healthcare Providers among others. The Emergency Contact may receive information such as the hospital name and address, notifications e.g. "surgery complete, in recovery room", "transferred to orthopedic ward room number XYZ", etc. There may be more than one Emergency Contact.

Patient Authentication is an integral part of this invention. Patient Authentication can be performed in several ways and any combination thereof, depending of the embodiment capabilities. In medical situations that were initiated by a call to 911, Ambulance Corps or other call center, the caller ID and/or caller's voice can be sent to the First Responder's Heathcare Provider Device. The first Responder can then authenticate the caller by caller ID and/or a built-in Speaker Recognition or any other biometric capability. During the call to the emergency hotline, the call center agent may request the Caller (whether the Caller is the Patient or a third party) to scan the Patient Device (via 2D barcode, NFC or other means according to the embodiment's capabilities) and communicate any significant information that uniquely identifies the Patient as a result of the scan. The information is then sent to the First Responder's device and may be used to authenticate the Patient.

The call center agent may also activate an SMS text message to be sent to the caller's phone (based on caller ID) with a link to an Authentication App that can perform several functions, such as allowing to scan the Patient Device (2D barcode, NFC, etc.) and sending the information to the First Responder as well as additional functions such as photographing the Patient, the situation scene, uploading video, audio, GPS location and/or any other information collection method that can be useful. The First Responder's Healthcare Provider Device may be equipped with corresponding capabilities that make use of these different types of information, such as assisted navigation to the scene thanks to the geo-location information, dispatching specific personnel and/or equipment based on the visual, audio and/or other information such as special equipment to cut through metal if the Patient looks trapped inside a car, etc.

First Responders and any other Healthcare providers may be also authenticated if so required in certain or all actions, using one or more authentication factors including but not limited to: username, password, biometric features, gesture recognition, scanning ID cards, physician's credentials or other documents, etc.

It is understood that the embodiments described herein are for the purpose of elucidation and should not be considered limiting the subject matter of the disclosure. Various modification, uses, substitutions, combinations, improvements, methods of production without departing from the scope or spirit of the present invention would be evident to a person skilled in the art.

The invention claimed is:

1. A system for providing emergency access to medical data of an individual, the system comprising:

a provisioning computer system configured to implement automated machine-to-machine provisioning that automatically:
imports medical data from an Electronic Health Record/Electronic Medical Record (EHR/EMR) system in a first format;
categorizes the medical data into emergency and non-emergency data;
modifies the medical data such that it is stored in a secure database in a second format displayable by a healthcare provider device; and
maps the emergency data to a unique identifier associated with the individual;
a patient device comprising radio-frequency identification (RFID) chip that encodes the unique identifier; and
the healthcare provider device comprising a smartphone that is configured to:
retrieve the unique identifier from the patient device by interacting with the RFID chip;
access the emergency data stored in the secure database;
corresponding to the unique identifier; and
in the second format displayable on the healthcare provider device; and
submit, to the provisioning computer system, an update to the medical data in the second format;
wherein, based on the update received from the healthcare provider device, the provisioning computer system is further configured to automatically:
modify the update to the medical data received from the healthcare provider device into the first format used by the EHR/EMR system;
synchronize the EHR/EMR system with the update to the medical data in the first format;
locate additional medical data stored in the EHR/EMR system that is pertinent to the update to the medical data received from the healthcare provider device;
import the additional medical data into the secure database;
link the additional medical data to the emergency data; and
transmit the additional medical data to a target healthcare facility along with the emergency data.

2. The system of claim 1, wherein the provisioning computer system is configured to:
i) import the medical data from multiple EHR/EMR systems over a dedicated client-server interface that communicates with an application program interface of a secure computer server;
ii) categorize said medical data into said emergency data and said non-emergency data; and
iii) within the secure database, map said emergency data with the unique identifier.

3. The system of claim 2, wherein the provisioning computer system is further configured to:
i) automatically import the medical data over a dedicated machine-to-machine interface connected to each of the EHR/EMR systems; and
ii) automatically categorize said medical data into said emergency data and said non-emergency data in accordance with prior privacy choices of the individual.

4. The system of claim 1 wherein:
said unique identifier is encoded in a scannable barcode; and
the patient device is configured to present the scannable barcode to provide the healthcare provider device access to the emergency data.

5. The system of claim 1 wherein:
the RFID chip is a near-field communication tag and
the patient device is configured to provide the healthcare provider device access to the emergency data via the near-field communication tag.

6. The system of claim 1 wherein:
the healthcare provider device is configured to authenticate the individual before the emergency data is accessed by the healthcare provider device.

7. The system of claim 4 wherein said barcode is printed on the patient device.

8. The system of claim 5 wherein said near-field communication tag is embedded into said patient device.

9. The system of claim 1 wherein: in response to scanning a barcode on the patient device, the healthcare provider device is configured to transmit authentication information captured from the individual to a medical data server associated with the secure database.

10. The system of claim 1 wherein the healthcare provider device is one of a plurality of healthcare provider devices and the plurality of healthcare provider devices are configured to form a self-organizing communications network.

11. The system of claim 10 wherein the self-organizing communications network is configured to provide wireless communications capabilities to each of the healthcare provider devices by linking at least a first healthcare provider device to at least a second healthcare provider device within wireless communication range of the first healthcare provider device.

12. The system of claim 11 wherein the first and second healthcare provider devices each act as a node in a private wireless network comprising the plurality of healthcare provider devices.

13. The system of claim 12 wherein at least one of the healthcare provider devices has a connection to a wireless gateway linked to a wireline infrastructure.

14. The system of claim 12 wherein each of the healthcare provider devices is configured to dynamically act as a node on the private wireless network in response to detecting that a conventional communication network is unavailable.

15. The system of claim 12 wherein said self-organizing communications network is configured such that any one of said healthcare provider devices in said private wireless network that is connected to a wireless gateway linked to a wireline infrastructure relays provided information from said private wireless network to the target healthcare facility via the wireless gateway.

16. The system of claim 10 wherein said self-organizing communications network is secured through utilization of encryption to secure transmission of the emergency data.

17. The system of claim 1 further comprising a medical data computer server that is configured:
to receive, from the healthcare provider device, details of a medical incident associated with the individual; and
in response to the receiving the details of the medical incident:
retrieve, from the secure database, the additional medical data that is pertinent to the medical incident; and
transmit the additional medical data to the healthcare provider device.

18. The system of claim 1 further comprising a medical data computer server that is configured to relay the emergency data and the additional medical data to the target healthcare facility.

19. The system of claim 1 wherein the medical data computer server is further configured to, in response to receiving the update to the medical data from the healthcare provider device in the second format:
   convert the update to the medical data into the first format that is acceptable by the EHR/EMR system; and
   synchronize the EHR/EMR system with the update to the medical data in the first format.

20. The system of claim 1 wherein the secure database is hosted on a medical data computer server and the medical data computer server is configured to transmit the emergency data and the additional medical data to the target healthcare facility in a third format.

\* \* \* \* \*